(12) United States Patent
Cho (10) Patent No.: US 11,296,543 B2
(45) Date of Patent: Apr. 5, 2022

(54) POWER SUPPLY DEVICE

(71) Applicant: Samsung SDI Co., Ltd., Yongin-si (KR)

(72) Inventor: Hyunsang Cho, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 16/335,926

(22) PCT Filed: Jul. 13, 2017

(86) PCT No.: PCT/KR2017/007506
§ 371 (c)(1),
(2) Date: Mar. 22, 2019

(87) PCT Pub. No.: WO2018/056559
PCT Pub. Date: Mar. 29, 2018

(65) Prior Publication Data
US 2019/0319482 A1    Oct. 17, 2019

(30) Foreign Application Priority Data

Sep. 23, 2016  (KR) ................. 10-2016-0122377

(51) Int. Cl.
*H02J 3/38* (2006.01)
*H02J 7/34* (2006.01)
(Continued)

(52) U.S. Cl.
CPC ............. *H02J 9/061* (2013.01); *H02J 3/28* (2013.01)

(58) Field of Classification Search
CPC ...... H02J 9/061; H02J 3/28; H02J 9/06; H02J 1/10; H02J 1/102; H02J 9/00; Y04S 20/01
(Continued)

(56) References Cited

U.S. PATENT DOCUMENTS 5,376,828 A * 12/1994 Kim .................. H02M 7/497
307/64
7,462,955 B2 * 12/2008 McNamara ............. H02J 3/005
307/64
(Continued)

FOREIGN PATENT DOCUMENTS

JP  2015-73416 A   4/2015
JP  2015-128354 A  7/2015
(Continued)

OTHER PUBLICATIONS

International Search Report for corresponding International Application No. PCT/KR2017/007506, dated Oct. 23, 2017, 5pp.
(Continued)

*Primary Examiner* — Rexford N Barnie
*Assistant Examiner* — Rasem Mourad
(74) *Attorney, Agent, or Firm* — Lewis Roca Rothgerber Christie LLP (57) ABSTRACT

Various embodiments provide power supply devices. According to an embodiment of the present disclosure, a power supply device includes: an energy storage unit configured to receive electrical energy from a first power source and store the electrical energy; a first switch unit configured to break electrical connection between the first power source and the energy storage unit when the first power source satisfies a predetermined condition; a first load connection unit electrically connected to the energy storage unit; a second load connection unit electrically connected to the energy storage unit; and a second switch unit configured to break electrical connection between the energy storage unit and the second load connection unit when the first power source satisfies the predetermined condition.

13 Claims, 8 Drawing Sheets

(51) Int. Cl.
*H02J 3/06* (2006.01)
*H02J 9/06* (2006.01)
*H02J 3/28* (2006.01)

(58) Field of Classification Search
USPC .......................................................... 307/19
See application file for complete search history.

(56) References Cited

U.S. PATENT DOCUMENTS

| | | | |
|---|---|---|---|
| 8,890,487 B2 | 11/2014 | Jung et al. | |
| 9,190,871 B2* | 11/2015 | Pfitzer | H02J 9/06 |
| 9,608,443 B2 | 3/2017 | Chung et al. | |
| 2002/0109410 A1* | 8/2002 | Young | H02J 9/062 |
| | | | 307/64 |
| 2003/0080622 A1* | 5/2003 | Koenig | H02J 9/062 |
| | | | 307/64 |
| 2008/0203820 A1* | 8/2008 | Kramer | H02J 3/38 |
| | | | 307/64 |
| 2009/0021079 A1* | 1/2009 | Johnson, Jr. | H02J 9/066 |
| | | | 307/68 |
| 2010/0264743 A1 | 10/2010 | Jung et al. | |
| 2012/0319477 A1* | 12/2012 | Brownlee | H02J 9/065 |
| | | | 307/23 |
| 2014/0232194 A1* | 8/2014 | Fujikawa | H01M 8/04955 |
| | | | 307/65 |
| 2015/0380968 A1* | 12/2015 | Lee | H02J 9/061 |
| | | | 713/300 |
| 2016/0049829 A1* | 2/2016 | Chang | H02J 9/062 |
| | | | 307/22 |
| 2016/0190865 A1* | 6/2016 | Shin | H02J 7/34 |
| | | | 307/65 |
| 2018/0013317 A1* | 1/2018 | Hayes | H02J 9/061 |

FOREIGN PATENT DOCUMENTS

| | | |
|---|---|---|
| KR | 2000-0006898 A | 2/2000 |
| KR | 10-0922015 B1 | 10/2009 |
| KR | 10-0947038 B1 | 3/2010 |
| KR | 10-0973458 B1 | 8/2010 |
| KR | 10-1144969 B1 | 5/2012 |
| KR | 10-1322617 B1 | 10/2013 |
| KR | 10-1331183 B1 | 11/2013 |
| KR | 10-1444266 B1 | 9/2014 |
| KR | 10-2015-0106838 A | 9/2015 |
| KR | 10-1656437 B1 | 9/2016 |
| WO | WO 2014/061933 A1 | 4/2014 |

OTHER PUBLICATIONS

Korean Office Action dated May 28, 2020, for corresponding Korean Patent Application No. 10-2016-0122377 (3 pages).

* cited by examiner

POWER SUPPLY DEVICE

CROSS-REFERENCE TO RELATED APPLICATION(S)

This application is a National Phase Patent Application of International Patent Application Number PCT/KR2017/007506, filed on Jul. 13, 2017, which claims priority of Korean Patent Application No. 10-2016-0122377, filed Sep. 23, 2016. The entire contents of both of which are incorporated herein by reference.

TECHNICAL FIELD

Embodiments of the present disclosure relate to a power supply device.

BACKGROUND ART

Technology for power storage devices, particularly power storage devices such as UPSs for continuously supplying electrical energy even when a grid power source malfunctions, has been actively developed with the increase in electrical energy consumption.

However, when the energy consumption of loads is lower or becomes lower than the designed capacity of such a power storage device, profit obtainable by operating the power storage device according to different energy prices may decrease.

Moreover, in this case, additional energy loss may occur due to low power conversion efficiency of the energy storage device under a low load factor condition.

DESCRIPTION OF EMBODIMENTS

Technical Problem

To solve the above-described problems, the present disclosure provides a power supply device configured to increase operation profit obtainable according to different energy prices.

In addition, the present disclosure provides a power conversion device having high efficiency.

In addition, the present disclosure provides a power supply device configured to continuously supply electrical energy to a load even though the load is not a main load.

Solution to Problem

According to an embodiment of the present disclosure, a power supply device may include: an energy storage unit configured to receive electrical energy from a first power source and store the electrical energy; a first switch unit configured to break electrical connection between the first power source and the energy storage unit when the first power source satisfies a predetermined condition; a first load connection unit electrically connected to the energy storage unit; a second load connection unit electrically connected to the energy storage unit; and a second switch unit configured to break electrical connection between the energy storage unit and the second load connection unit when the first power source satisfies the predetermined condition.

The predetermined condition may be a condition in which the first power source undergoes at least one of an instantaneous voltage sag, an instantaneous voltage swell, a short duration interruption, an instantaneous interruption, and a frequency change.

The first load connection unit may be electrically connected to a first load, the second load connection unit may be electrically connected to a second load, the first load may require continuous supply of electrical energy thereto, and the second load may not require continuous supply of electrical energy thereto.

When the first power source does not satisfy the predetermined condition, the first and second loads may receive electrical energy from the first power source through the energy storage unit.

When the first power source satisfies the predetermined condition, the first load may receive electrical energy from the energy storage unit.

The power supply device may further include: a second power source electrically connected to the second load connection unit; and a third switch unit configured to electrically connect the second power source and the second load connection unit to each other when the first power source satisfies the predetermined condition.

When the first power source satisfies the predetermined condition, the second switch unit may break electrical connection between the second power source and the first load connection unit.

Only when the first power source satisfies the predetermined condition, the second power source may produce electrical energy and supply the electrical energy.

The first power source may be a grid power source.

According to another embodiment of the present disclosure, a power supply device may include: an energy storage unit configured to receive electrical energy from a first power source and store the electrical energy; a control unit configured to determine whether the first power source satisfies a predetermined condition and generate at least one control signal based on results of the determination; a first switch unit configured to break electrical connection between the first power source and the energy storage unit on a basis of a first control signal generated by the control unit when the first power source satisfies the predetermined condition; a first load connection unit electrically connected to the energy storage unit; a second load connection unit electrically connected to the energy storage unit; and a second switch unit configured to break electrical connection between the energy storage unit and the second load connection unit on a basis of a second control signal generated by the control unit when the first power source satisfies the predetermined condition.

The predetermined condition may be a condition in which the first power source undergoes at least one of an instantaneous voltage sag, an instantaneous voltage swell, a short duration interruption, an instantaneous interruption, and a frequency change.

The first load connection unit may be electrically connected to a first load, the second load connection unit may be electrically connected to a second load, the first load may require continuous supply of electrical energy thereto, and the second load may not require continuous supply of electrical energy thereto.

When the first power source does not satisfy the predetermined condition, the control unit may generate a third control signal for electrically connecting the first power source and the energy storage unit to each other and a fourth control signal for electrically connecting the energy storage unit and the second load connection unit to each other, the first switch unit may electrically connect the first power source and the energy storage unit to each other on a basis of the third control signal, and the second switch unit may electrically connect the energy storage unit and the second load connection unit to each other on a basis of the fourth control signal.

The power supply device may further include: a second power source electrically connected to the second load connection unit; and a third switch unit configured to electrically connect the second power source and the second load connection unit to each other on a basis of a fifth control signal generated by the control unit when the first power source satisfies the predetermined condition.

Only when the first power source satisfies the predetermined condition, the control unit may generate a sixth control signal to cause the second power source to produce electrical energy and supply the electrical energy. In this case, the first power source may be a grid power source.

Advantageous Effects of Disclosure

According to various embodiments of the present disclosure, more profit may be obtained according to different energy prices.

In addition, energy conversion loss may be minimized at an energy storage unit owing to a high load factor.

In addition, high-quality electrical energy may be supplied to a load even though the load is not a main load.

In addition, continuous supply of energy to a main load may be guaranteed, and continuous supply of energy to other loads may also be guaranteed.

BEST MODE

According to an embodiment of the present disclosure, a power supply device includes: an energy storage unit configured to receive electrical energy from a first power source and store the electrical energy; a first switch unit configured to break electrical connection between the first power source and the energy storage unit when the first power source satisfies a predetermined condition; a first load connection unit electrically connected to the energy storage unit; a second load connection unit electrically connected to the energy storage unit; and a second switch unit configured to break electrical connection between the energy storage unit and the second load connection unit when the first power source satisfies the predetermined condition.

Mode of Disclosure

Advantages and features of the present disclosure, and implementation methods thereof will be clarified through the following descriptions given with reference to the accompanying drawings. However, the following embodiments of the present disclosure are non-limiting examples and may have different forms, and it should be understood that the idea and technical scope of the present disclosure cover all the modifications, equivalents, and replacements. Rather, these embodiments are provided so that this disclosure will be thorough and complete, and will fully convey the scope of the present disclosure to those skilled in the art. Moreover, detailed descriptions related to well-known functions or configurations will be omitted in order not to unnecessarily obscure subject matters of the present disclosure.

For example, specific shapes, structures, and features described in one example embodiment may be modified in another example embodiment without departing from the scope of the present disclosure. In addition, the positions or arrangement of elements described in one example embodiment may be changed in another example embodiment within the scope of the present disclosure. That is, the following description is provided for illustrative purposes only and is not intended to limit the scope of the present disclosure. The scope of the present disclosure is defined by the claims and equivalents thereof. In the drawings, like reference numerals denote like elements. Details described in the present disclosure are examples. That is, such details may be changed in other example embodiments within the spirit and scope of the present disclosure.

It will be understood that although the terms "first," "second," etc. may be used herein to describe various elements, these elements should not be limited by these terms. These terms are only used to distinguish one element from another.

The terminology used herein is for explaining specific embodiments only and is not intended to limit the scope of the present disclosure. The terms of a singular form may include plural forms unless otherwise mentioned. It will be understood that terms such as "comprise," "include," and "have," when used herein, specify the presence of state features, integers, steps, operations, elements, components, or combinations thereof, but do not preclude the presence or addition of one or more other features, integers, steps, operations, elements, components, or combinations thereof. It will be understood that although the terms "first" and "second" are used herein to describe various elements, these elements should not be limited by these terms. These terms are only used to distinguish one element or component from other elements or components.

Hereinafter, example embodiments will be described in detail with reference to the accompanying drawings. In the drawings, like reference numerals denote like elements, and overlapping descriptions thereof will be omitted.

First Embodiment

Figure 1:
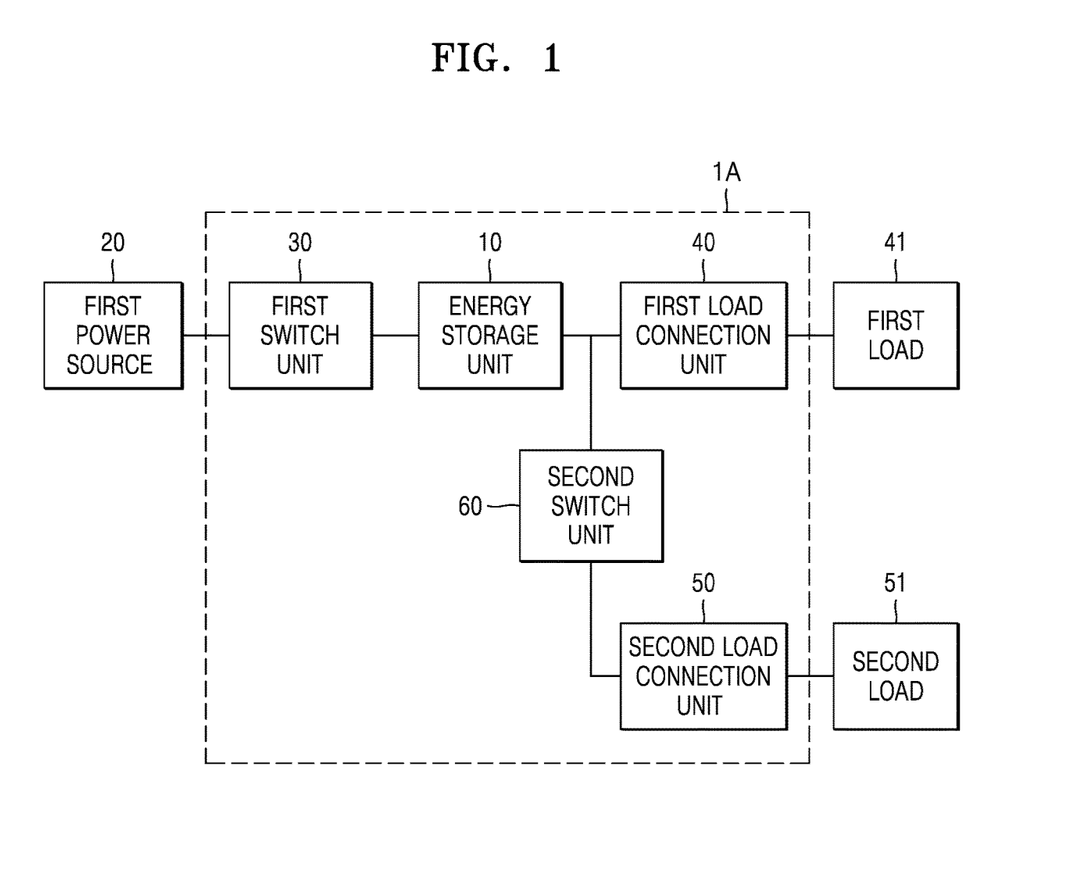
FIG. 1 is a view illustrating a schematic configuration of a power supply device according to a first embodiment of the present disclosure.

FIG. 1 illustrates a schematic configuration of a power supply device 1A according to a first embodiment of the present disclosure.

Referring to FIG. 1, the power supply device 1A according to the first embodiment of the present disclosure may include an energy storage unit 10, a first switch unit 30, a first load connection unit 40, a second load connection unit 50, and a second switch unit 60.

The energy storage unit 10 according to the present embodiment may be any unit capable of storing electrical energy. For example, the energy storage unit 10 may be any one or a combination of one or more of an uninterruptible power supply (UPS), an energy storage system (ESS), and an uninterruptible energy storage (UES). However, this is an example, and the idea of the present disclosure is not limited thereto. That is, any unit capable of receiving electrical energy and storing the electrical energy temporarily and/or permanently may be used as the energy storage unit 10 of the present disclosure. However, for ease of description, the following description will be presented assuming that the energy storage unit 10 is a UES.

As described above, the energy storage unit 10 according to the present embodiment may receive electrical energy from a first power source 20 and may store the electrical energy. When the first power source 20 satisfies a predetermined condition, the energy storage unit 10 may supply electrical energy to a load. The first power source 20 may refer to a grid power source, and the load may include a first load 41 and a second load 51. The first load 41 may be electrically connected to the first load connection unit 40 and may require continuous supply of electrical energy thereto. The second load 51 may be electrically connected to the second load connection unit 50 and may not require continuous supply of electrical energy thereto.

In addition, the "predetermined condition" may refer to a condition in which the first power source 20 undergoes at least one of an instantaneous voltage sag, an instantaneous voltage swell, a short duration interruption, an instantaneous interruption, and a frequency change. In addition, the "predetermined condition" may refer to any other condition in which supply of energy from the first power source 20 to the load is not suitable.

Thus, according to the present disclosure, when it is not suitable for a main power source such as the first power source 20 to supply electrical energy, stored electrical energy may be supplied to the load, particularly to the first load 41, thereby guaranteeing continuous operations of the load.

In addition, the energy storage unit 10 of the present embodiment may store electrical energy in a time period in which the supply price of energy is relatively low among time-based energy supply prices of the first power source 20 and may supply the stored electrical energy to the loads 41 and 51 in a time period in which the supply price of energy is relatively high. In this manner, the present disclosure enables economical operations of the power supply device 1A.

The first switch unit 30 of the present embodiment may electrically disconnect the first power source 20 and the energy storage unit 10 from each other when the first power source 20 satisfies the predetermined condition.

In the present disclosure, "switch units" such as the first and second switch units 30 and 60 of the present embodiment and a third switch unit 80 (refer to FIG. 3) of another embodiment may refer to various units capable of allowing or not allowing electrical connection of or between one or more elements connected thereto. Thus, such a switch unit may include at least one switch to connect or disconnect at least one connection line of or between one or more adjacent elements. In this case, the number of switches may be determined according to the number of connection lines.

In addition, as described above, the "predetermined condition" may include various conditions in which the first power source 20 is not suitable for supplying energy. For example, the "predetermined condition" may refer to a condition in which the first power source 20 undergoes at least one of an instantaneous voltage sag, an instantaneous voltage swell, a short duration interruption, an instantaneous interruption, and a frequency change.

As described above, when the first power source 20 is not suitable for supplying energy, the first switch unit 30 may break electrical connection between the first power source 20, the power supply device 1A, and the loads 41 and 51 to prevent breakdowns of the power supply device 1A and the loads 41 and 51.

In the present embodiment, when the first power source 20 satisfies the predetermined condition, the second switch unit 60 may break electrical connection between the energy storage unit 10 and the second load connection unit 50.

In the related art, when the energy consumption capacity of the load is lower or becomes lower than the designed energy capacity of the energy storage unit 10, profit obtainable by different energy prices may decrease. In this case, additional energy loss may occur due to low power conversion efficiency of the energy storage unit 10 under a low load factor condition.

When the first power source 20 does not satisfy the predetermined condition, the energy storage unit 10 may supply energy to the second load 51 in addition to the first load 41, thereby maximizing profit according to different energy prices, and the power conversion efficiency of the energy storage unit 10 may be maintained at a high value such that energy loss may be minimized.

In addition, when the first power source 20 satisfies the predetermined condition, that is, when the first power source 20 is not suitable for supplying energy, connection between the energy storage unit 10 and the second load connection unit 50 may be broken to supply energy only to the first load 41, which is a main load.

Thus, according to the present disclosure, continuous supply of energy from the energy storage unit 10 may be guaranteed as originally intended, and along with this, the power supply device 1A may be operated at high efficiency.

"Load connection units" such as the first load connection unit 40 and the second load connection unit 50 of the present embodiment may be any units capable of electrically connecting the power supply device 1A of the present disclosure to the loads 41 and 51.

In addition, as described above, the first load connection unit 40 may be connected to the first load 41 that requires continuous supply of electrical energy, and the second load connection unit 50 may be connected to the second load 51 that does not require continuous supply of energy. In this case, whether continuous supply of energy is required or not may be determined according to the installation purposes of the power supply device 1A and/or environments in which the power supply device 1A is installed.

Figure 2A:
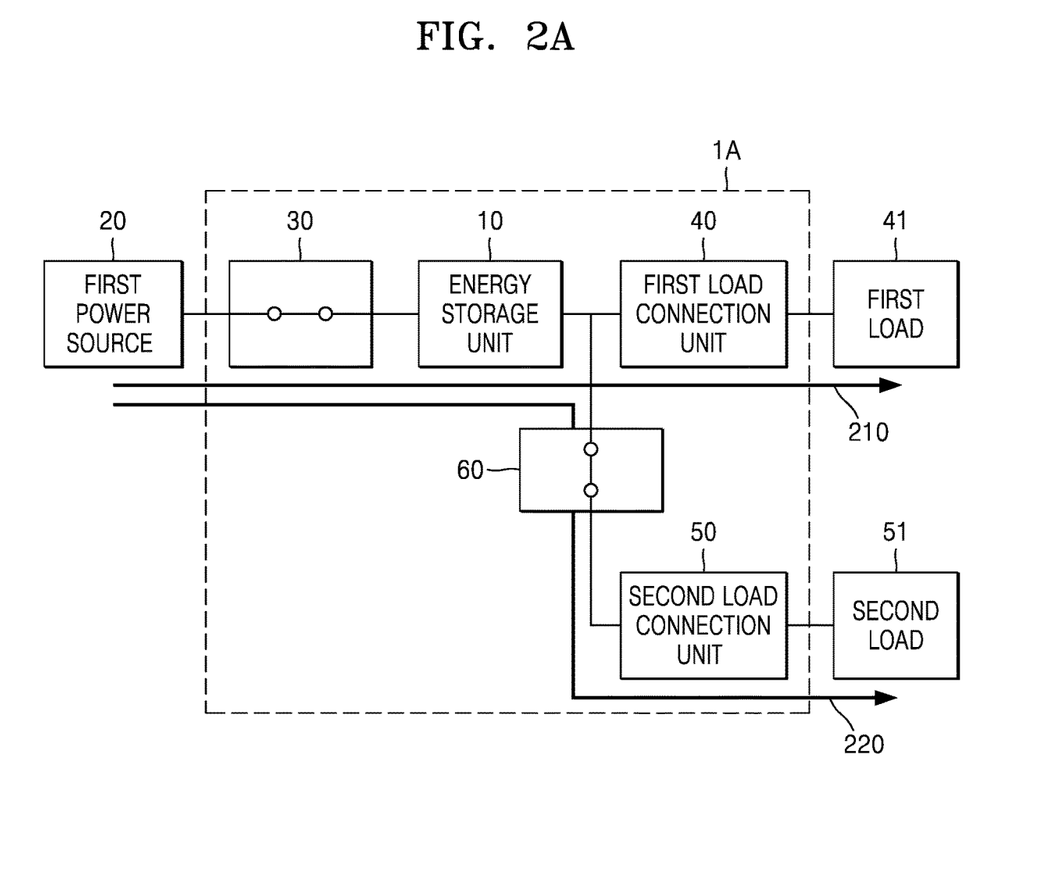
FIG. 2A is a view illustrating the supply flow of electrical energy when a first power source does not satisfy a predetermined condition.
Figure 2B:
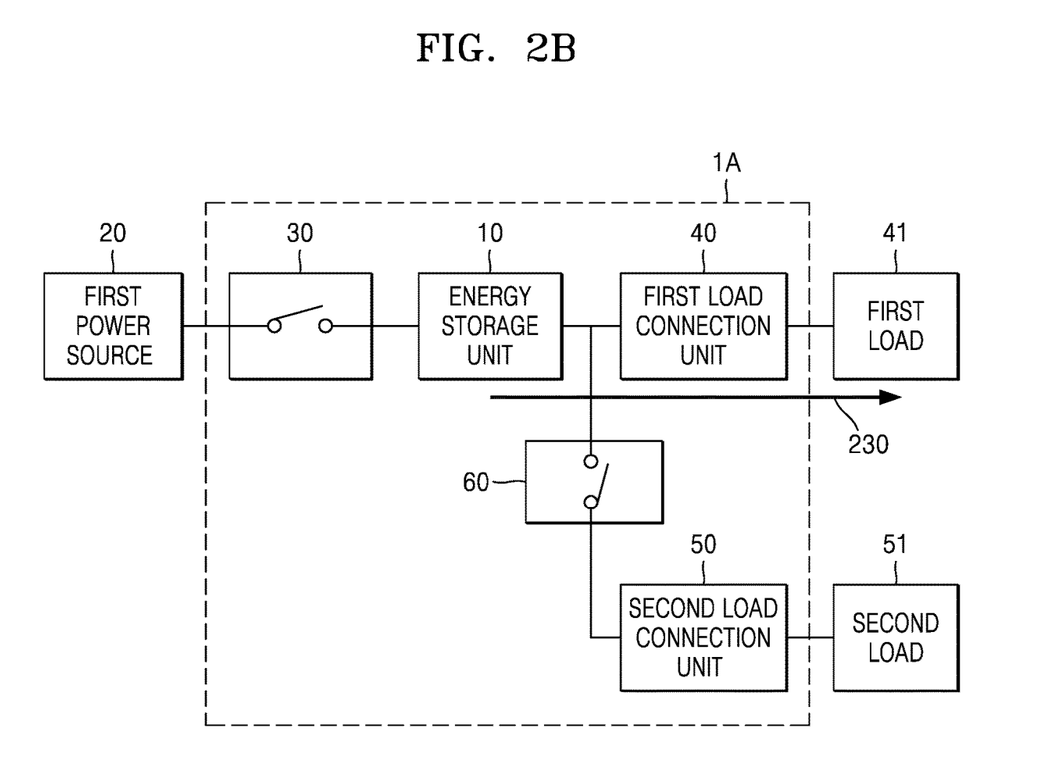
FIG. 2B is a view illustrating the supply flow of electrical energy when the first power source satisfies the predetermined condition.

FIGS. 2A and 2B are views illustrating operations of the power supply device 1A according to the first embodiment of the present disclosure. In FIGS. 2A and 2B, each switch unit is indicated with a switch symbol for ease of description.

FIG. 2A is a view illustrating the supply flow of electrical energy when the first power source 20 does not satisfy the predetermined condition.

Referring to FIG. 2A, when the first power source 20 does not satisfy the predetermined condition, both the first load 41 and the second load 51 may receive electrical energy 210 and 220 from the first power source 20 through the energy storage unit 10.

Thus, the power supply device 1A of the present embodiment may have effects of: i) obtaining high profit according to energy prices, ii) minimizing energy conversion loss in the energy storage unit 10 owing to a high load factor, and iii) supplying high-quality electrical energy even to the second load 51, which is not a main load.

FIG. 2B is a view illustrating the supply flow of electrical energy when the first power source 20 satisfies the predetermined condition.

Referring to FIG. 2B, when the first power source 20 satisfies the predetermined condition, the first load 41 may receive electrical energy 230 from the energy storage unit 10. In this case, the second load 51 may not receive electrical energy from the energy storage unit 10.

Thus, in addition to the above-mentioned effects, the power supply device 1A of the present embodiment may have another effect of: iv) ensuring continuous supply of energy to the main load, that is, the first load 41 as originally intended.

Second Embodiment

Figure 3:
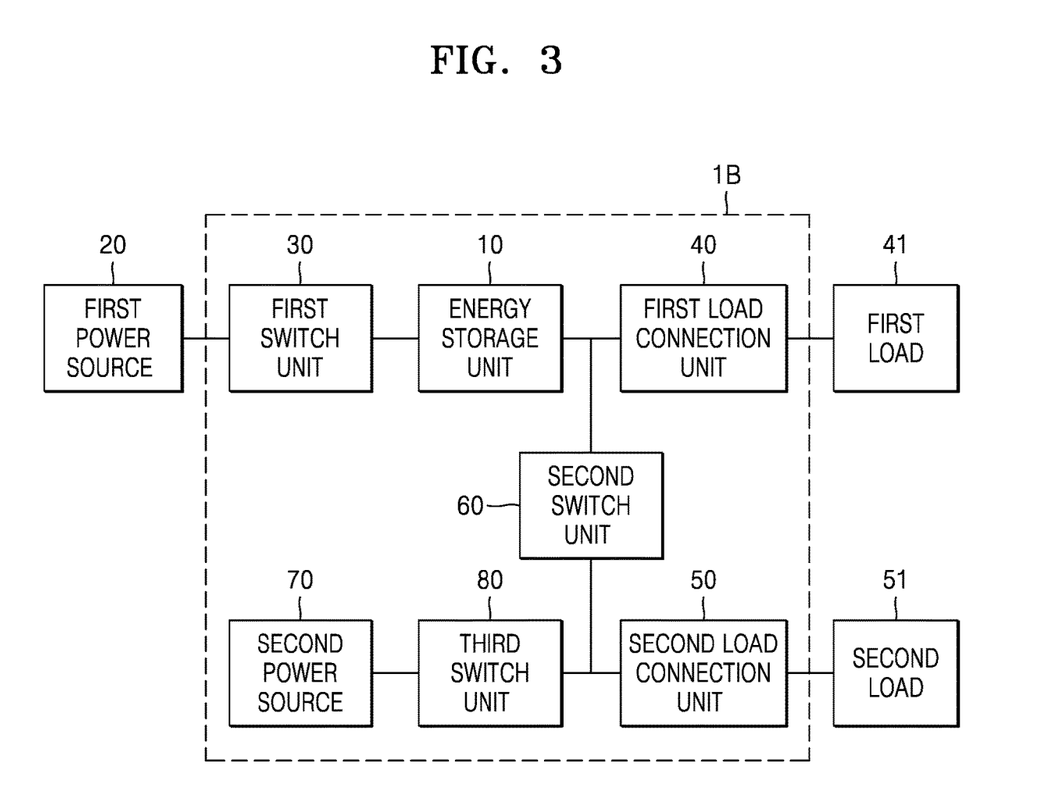
FIG. 3 is a view illustrating a schematic configuration of a power supply device according to a second embodiment of the present disclosure.

FIG. 3 illustrates a schematic configuration of a power supply device 1B according to a second embodiment of the present disclosure.

Referring to FIG. 3, the power supply device 1B according to the second embodiment of the present disclosure may further include a second power source 70 and a third switch unit 80 in addition to the energy storage unit 10, the first switch unit 30, the first load connection unit 40, the second load connection unit 50, and the second switch unit 60 that are included in the power supply device 1A (refer to FIG. 1) of the first embodiment.

Since the energy storage unit 10, the first switch unit 30, the first load connection unit 40, the second load connection unit 50, and the second switch unit 60 have been described in detail in the first embodiment, detailed descriptions thereof will be not be presented here.

According to the present embodiment, the second power source 70 may refer to any energy providing unit capable of supplying electrical energy temporarily and/or permanently. For example, the second power source 70 may be a diesel generator configured to be operated only when the supply of electrical energy from the first power source 20 is not suitable. Alternatively, the second power source 70 may be any one of an uninterruptible power supply (UPS), an energy storage system (ESS), an uninterruptible energy storage (UES), and a hybrid UPS, or may be a separate grid power source.

The second power source 70 may be configured to supply energy to the second load 51 when the first power source 20 is not suitable for supplying energy, and a detailed description thereof will be presented later.

The third switch unit 80 of the present embodiment may electrically connect the second power source 70 and the second load connection unit 50 to each other when the first power source 20 satisfies the certain condition.

In the first embodiment described above, when the first power source 20 satisfies the predetermined condition, that is, when the first power source 20 is not suitable for supplying energy, the second load 51 may not receive electrical energy from the energy storage unit 10 (refer to the detailed description of FIG. 2B).

However, in the present embodiment, even when the first power source 20 satisfies the predetermined condition, that is, even when the first power source 20 is not suitable for supplying energy, the second power source 70 being a separate power source may supply energy to the second load 51 to ensure continuous operations of the second load 51.

Figure 4A:
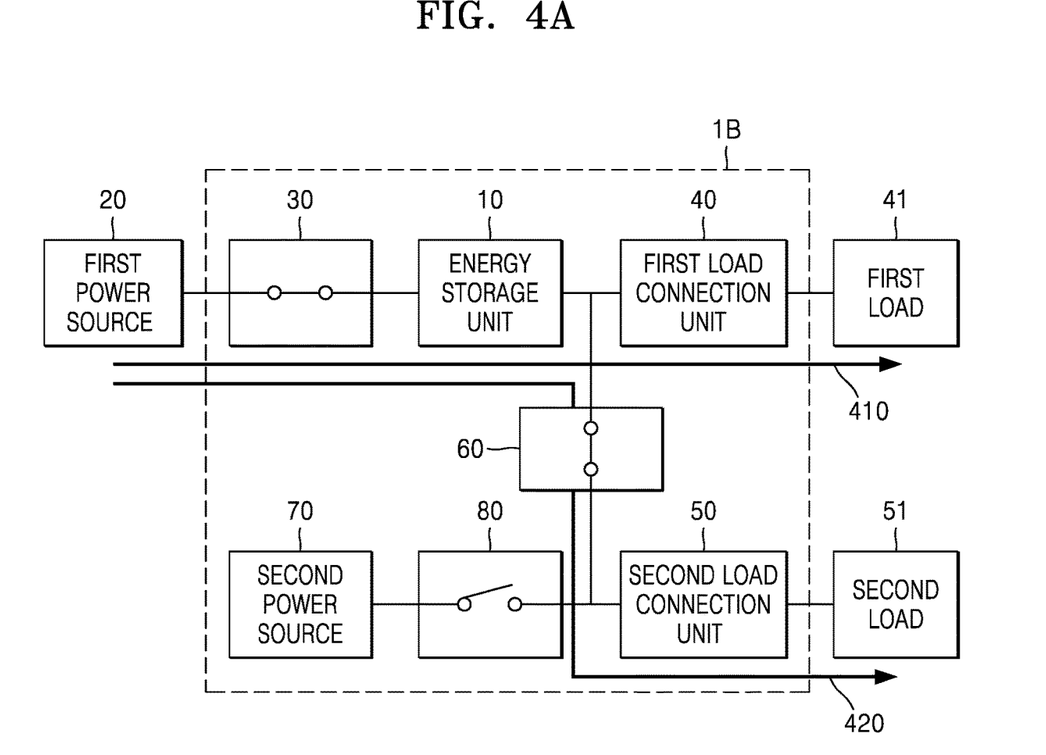
FIG. 4A is a view illustrating the supply flow of electrical energy when the first power source does not satisfy a predetermined condition.
Figure 4B:
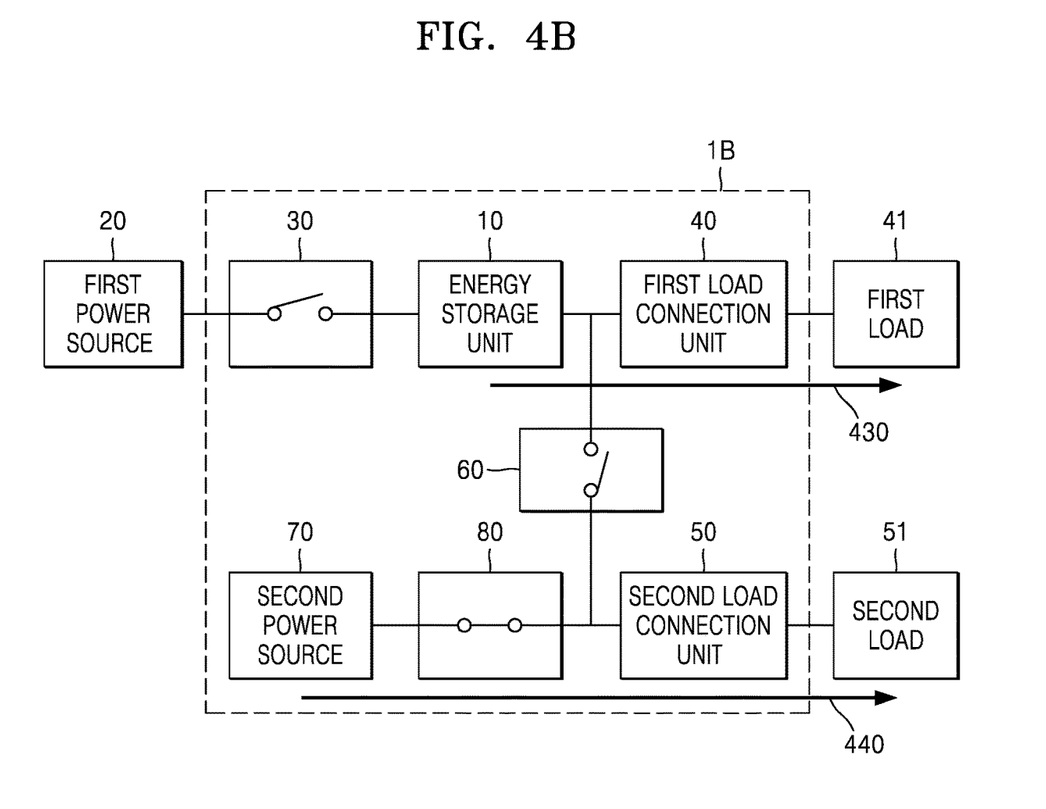
FIG. 4B is a view illustrating the supply flow of electrical energy when the first power source satisfies the predetermined condition.

FIGS. 4A and 4B are views illustrating operations of the power supply device 1B according to the second embodiment of the present disclosure. In FIGS. 4A and 4B, each switch unit is indicated with a switch symbol for ease of description.

FIG. 4A is a view illustrating the supply flow of electrical energy when the first power source 20 does not satisfy the predetermined condition.

Referring to FIG. 4A, when the first power source 20 does not satisfy the predetermined condition, both the first load 41 and the second load 51 may receive electrical energy 410 and 420 from the first power source 20 through the energy storage unit 10.

Thus, the power supply device 1B of the present embodiment may have effects of: i) obtaining high profit according to energy prices, ii) minimizing energy conversion loss in the energy storage unit 10 owing to a high load factor, and iii) supplying high-quality electrical energy even to the second load 51, which is not a main load.

FIG. 4B is a view illustrating the supply flow of electrical energy when the first power source 20 satisfies the predetermined condition.

Referring to FIG. 4B, when the first power source 20 satisfies the predetermined condition, the first load 41 may receive electrical energy 430 from the energy storage unit 10.

In addition, unlike in the first embodiment, the second load 51 may receive electrical energy 440 from the second power source 70.

Thus, in addition to the above-mentioned effects, the power supply device 1B of the present embodiment may have other effects of: iv) ensuring continuous supply of energy to the main load, that is, the first load 41 as originally intended and v) ensuring continuous supply of energy to the other load, that is, the second load 51.

Third Embodiment

Figure 5:
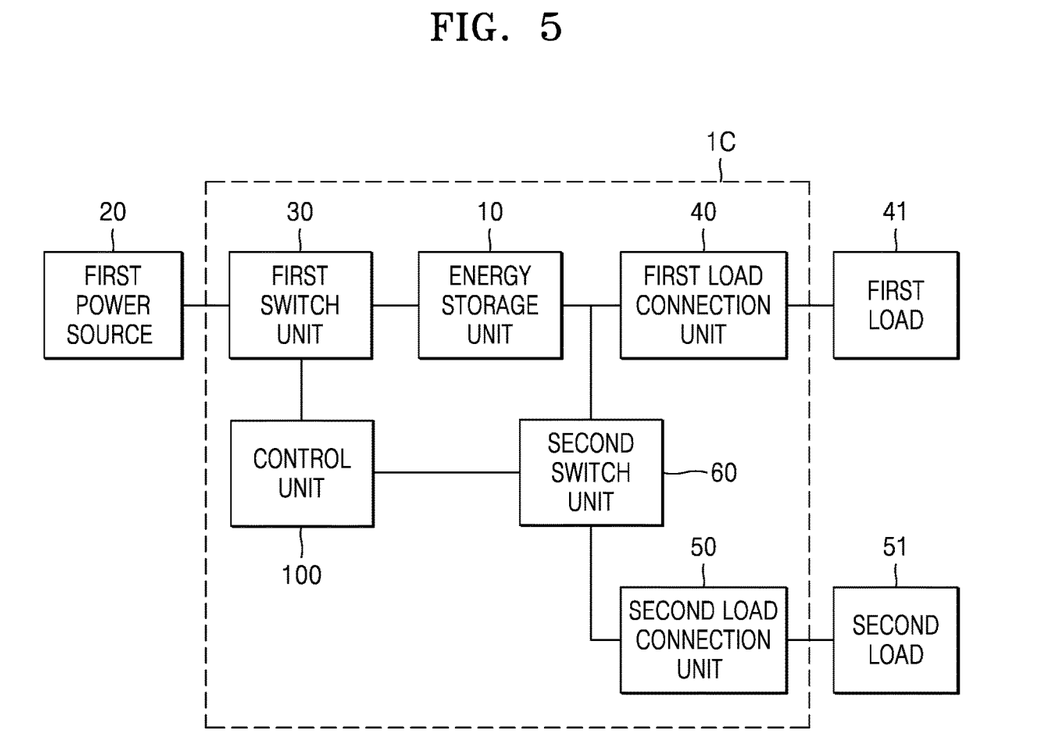
FIG. 5 is a view illustrating a schematic configuration of a power supply device according to a third embodiment of the present disclosure.

FIG. 5 illustrates a schematic configuration of a power supply device 1C according to a third embodiment of the present disclosure.

Referring to FIG. 5, the power supply device 1C according to the third embodiment of the present disclosure may further include a control unit 100 in addition to the energy storage unit 10, the first switch unit 30, the first load connection unit 40, the second load connection unit 50, and the second switch unit 60 that are included in the power supply device 1A (refer to FIG. 1) of the first embodiment.

The control unit 100 of the present embodiment may include any kind of device such as a processor capable of processing data. Here, the "processor" may refer to a data processing device included in hardware and having a physically structured circuit to execute code of programs or functions expressed with instructions. Examples of the data processing device included in hardware may include a microprocessor, a central processing unit (CPU), a processor core, a multiprocessor, an application-specific integrated circuit (ASIC), and a field programmable gate array (FPGA). However, the scope of the present disclosure is not limited thereto.

The control unit 100 may determine whether the first power source 20 satisfies the predetermined condition and may generate at least one control signal based on results of the determination. In this case, the control signal may be for controlling switching operations of the first switch unit 30 and the second switch unit 60.

In more detail, when the first power source 20 satisfies the predetermined condition, the control unit 100 may generate a first control signal for breaking electrical connection between the first power source 20 and the energy storage unit 10. In addition, when the first power source 20 does not satisfy the predetermined condition, the control unit 100 may generate a third control signal for electrically connecting the first power source 20 and the energy storage unit 10 to each other.

The first switch unit 30 may break electrical connection between the first power source 20 and the energy storage unit 10 on the basis of the first control signal generated by the control unit 100. In addition, the first switch unit 30 may electrically connect the first power source 20 and the energy storage unit 10 to each other on the basis of the third control signal generated by the control unit 100.

Similarly, when the first power source 20 satisfies the predetermined condition, the control unit 100 may generate a second control signal for breaking electrical connection between the energy storage unit 10 and the second load connection unit 50. In addition, when the first power source 20 does not satisfy the predetermined condition, the control unit 100 may generate a fourth control signal for electrically connecting the energy storage unit 10 and the second load connection unit 50 to each other.

Then, the second switch unit 60 may break electrical connection between the energy storage unit 10 and the second load connection unit 50 on the basis of the second control signal generated by the control unit 100. In addition, the second switch unit 60 may electrically connect the energy storage unit 10 and the second load connection unit 50 to each other on the basis of the fourth control signal generated by the control unit 100.

In this manner, the present embodiment may have the same effects as the first embodiment described above, and thus detailed descriptions of the effects will not be presented here.

Fourth Embodiment

Figure 6:
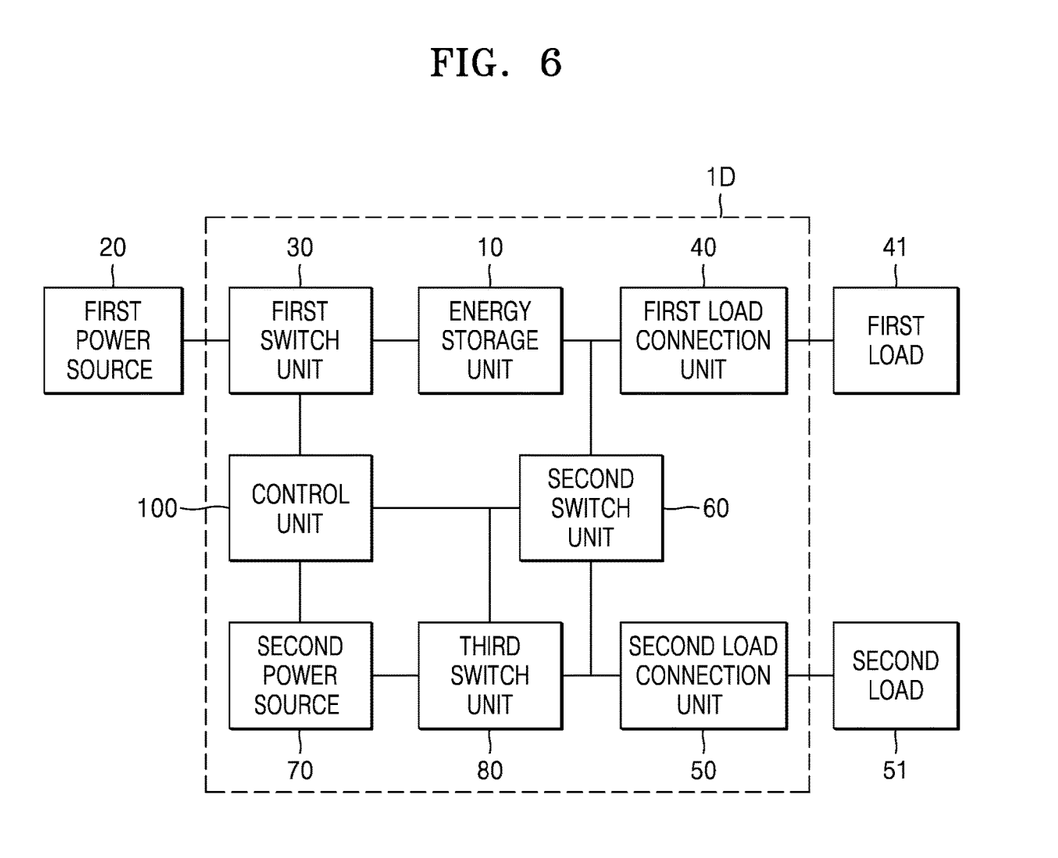
FIG. 6 is a view illustrating a schematic configuration of a power supply device according to a fourth embodiment of the present disclosure.

FIG. 6 illustrates a schematic configuration of a power supply device 1D according to a fourth embodiment of the present disclosure.

Referring to FIG. 6, the power supply device 1D according to the fourth embodiment of the present disclosure may further include a control unit 100 in addition to the energy storage unit 10, the first switch unit 30, the first load connection unit 40, the second load connection unit 50, the second switch unit 60, the second power source 70, and the third switch unit 80 that are included in the power supply device 1B (refer to FIG. 3) of the second embodiment.

The control unit 100 of the present embodiment may include any kind of device such as a processor capable of processing data. Here, the "processor" may refer to a data processing device included in hardware and having a physically structured circuit to execute code of programs or functions expressed with instructions. Examples of the data processing device included in hardware may include a microprocessor, a central processing unit (CPU), a processor core, a multiprocessor, an application-specific integrated circuit (ASIC), and a field programmable gate array (FPGA). However, the scope of the present disclosure is not limited thereto.

The control unit 100 may determine whether the first power source 20 satisfies the predetermined condition and may generate at least one control signal based on results of the determination. In this case, the control signal may be a control signal for controlling switching operations of the first switch unit 30, the second switch unit 60, and the third switch unit 80.

In more detail, when the first power source 20 satisfies the predetermined condition, the control unit 100 may generate a first control signal for breaking electrical connection between the first power source 20 and the energy storage unit 10. In addition, when the first power source 20 does not satisfy the predetermined condition, the control unit 100 may generate a third control signal for electrically connecting the first power source 20 and the energy storage unit 10 to each other.

The first switch unit 30 may break electrical connection between the first power source 20 and the energy storage unit 10 on the basis of the first control signal generated by the control unit 100. In addition, the first switch unit 30 may electrically connect the first power source 20 and the energy storage unit 10 to each other on the basis of the third control signal generated by the control unit 100.

Similarly, when the first power source 20 satisfies the predetermined condition, the control unit 100 may generate a second control signal for breaking electrical connection between the energy storage unit 10 and the second load connection unit 50. In addition, when the first power source 20 does not satisfy the predetermined condition, the control unit 100 may generate a fourth control signal for electrically connecting the energy storage unit 10 and the second load connection unit 50 to each other.

Then, the second switch unit 60 may break electrical connection between the energy storage unit 10 and the second load connection unit 50 on the basis of the second control signal generated by the control unit 100. In addition, the second switch unit 60 may electrically connect the energy storage unit 10 and the second load connection unit 50 to each other on the basis of the fourth control signal generated by the control unit 100.

In addition, when the first power source 20 satisfies the predetermined condition, the control unit 100 may generate a fifth control signal for electrically connecting the second power source 70 and the second load connection unit 50 to each other. Then, the third switch unit 80 may electrically connect the second power source 70 and the second load connection unit 50 to each other on the basis of the fifth control signal generated by the control unit 100. Furthermore, when the first power source 20 satisfies the predetermined condition, the control unit 100 may further generate a drive control signal for driving the second power source 70, in addition to the fifth control signal.

In this manner, the present embodiment may have the same effects as the second embodiment described above, and thus detailed descriptions of the effects will not be presented here.

Preferable embodiments of the present disclosure have been mainly described. However, it will be apparent to those skilled in the art that various changes and modifications may be made without departing from the spirit and scope of the present disclosure. Therefore, the embodiments described herein should be considered in a descriptive sense only and not for purposes of limitation. The scope of the present disclosure is defined not by the above description but by the following claims, and all differences within equivalent ranges of the scope of the present disclosure should be considered as being included in the scope of the present disclosure.

The invention claimed is:

1. A power supply device comprising:
    an energy storage unit configured to receive electrical energy from a first power source and store the electrical energy;
    a first switch unit configured to break electrical connection between the first power source and the energy storage unit when the first power source satisfies a predetermined condition;
    a first load connection unit electrically connected to the energy storage unit;
    a second load connection unit electrically connected to the energy storage unit; and
    a second switch unit configured to break electrical connection between the energy storage unit and the second load connection unit when the first power source satisfies the predetermined condition;
    a second power source; and
    a third switch unit configured to selectively electrically connect the second power source and the second load connection unit to each other when the first power source satisfies the predetermined condition,
    wherein the first load connection unit is electrically connected to a first load, and the second load connection unit is electrically connected to a second load,
    wherein the first load requires continuous supply of electrical energy thereto, and
    wherein the second load does not require continuous supply of electrical energy thereto, and
    wherein, when the first power source satisfies the predetermined condition, the third switch unit electrically connects the second power source to the second load connection unit and the second switch unit breaks electrical connection between the second power source and the energy storage unit,
    wherein the energy storage unit is electrically connected on one end to the first switch unit and on another end to the first load connection unit and the second switch unit.

2. The power supply device of claim 1, wherein the predetermined condition is a condition in which the first power source undergoes at least one of an instantaneous voltage sag, an instantaneous voltage swell, a short duration interruption, an instantaneous interruption, and a frequency change.

3. The power supply device of claim 1, wherein, when the first power source does not satisfy the predetermined condition, the first and second loads receive electrical energy from the first power source through the energy storage unit.

4. The power supply device of claim 1, wherein, when the first power source satisfies the predetermined condition, the first load receives electrical energy from the energy storage unit.

5. The power supply device of claim 1, wherein, when the first power source satisfies the predetermined condition, the second switch unit breaks electrical connection between the second power source and the first load connection unit.

6. The power supply device of claim 1, wherein, only when the first power source satisfies the predetermined condition, the second power source produces electrical energy and supplies the electrical energy.

7. The power supply device of claim 1, wherein the first power source is a grid power source.

8. A power supply device comprising:
    an energy storage unit configured to receive electrical energy from a first power source and store the electrical energy;
    a control unit configured to determine whether the first power source satisfies a predetermined condition and generate at least one control signal based on results of the determination;
    a first switch unit configured to break electrical connection between the first power source and the energy storage unit on a basis of a first control signal generated by the control unit when the first power source satisfies the predetermined condition;
    a first load connection unit electrically connected to the energy storage unit;
    a second load connection unit electrically connected to the energy storage unit; and
    a second switch unit configured to break electrical connection between the energy storage unit and the second load connection unit on a basis of a second control signal generated by the control unit when the first power source satisfies the predetermined condition;
    a second power source; and
    a third switch unit configured to electrically connect the second power source and the second load connection unit to each other on a basis of a fifth control signal generated by the control unit when the first power source satisfies the predetermined condition,
    wherein, when the first power source satisfies the predetermined condition, the second switch unit breaks electrical connection between the second power source and the energy storage unit on the basis of the second control signal,
    wherein the energy storage unit is electrically connected on one end to the first switch unit and on another end to the first load connection unit and the second switch unit.

9. The power supply device of claim 8, wherein the predetermined condition is a condition in which the first power source undergoes at least one of an instantaneous voltage sag, an instantaneous voltage swell, a short duration interruption, an instantaneous interruption, and a frequency change.

10. The power supply device of claim 8, wherein the first load connection unit is electrically connected to a first load,
    the second load connection unit is electrically connected to a second load,
    the first load requires continuous supply of electrical energy thereto, and
    the second load does not require continuous supply of electrical energy thereto.

11. The power supply device of claim 10, wherein, when the first power source does not satisfy the predetermined condition,
    the control unit generates a third control signal for electrically connecting the first power source and the energy storage unit to each other and a fourth control signal for electrically connecting the energy storage unit and the second load connection unit to each other,
    the first switch unit electrically connects the first power source and the energy storage unit to each other on a basis of the third control signal, and
    the second switch unit electrically connects the energy storage unit and the second load connection unit to each other on a basis of the fourth control signal.

12. The power supply device of claim 10, wherein, only when the first power source satisfies the predetermined condition, the control unit generates a sixth control signal to cause the second power source to produce electrical energy and supply the electrical energy.

13. The power supply device of claim 8, wherein the first power source is a grid power source.

* * * * *